(12) United States Patent
Chan et al.

(10) Patent No.: US 8,670,949 B2
(45) Date of Patent: Mar. 11, 2014

(54) REAL-TIME MONITORING, FEEDBACK, IDENTIFICATION AND LABELING SYSTEMS FOR CONDOM AND GLOVE PRODUCTS QUALITY INFORMATION AND METHODS THEREOF

(76) Inventors: Victor W. J. Chan, Richmond (CA); Rulin Chen, Guangdong (CN)

( * ) Notice: Subject to any disclaimer, the term of this patent is extended or adjusted under 35 U.S.C. 154(b) by 541 days.

(21) Appl. No.: 12/958,995

(22) Filed: Dec. 2, 2010

(65) Prior Publication Data

US 2011/0246111 A1    Oct. 6, 2011

Related U.S. Application Data

(63) Continuation-in-part of application No. 12/830,647, filed on Jul. 6, 2010, now abandoned.

(30) Foreign Application Priority Data

Dec. 3, 2009  (CN) .......................... 2009 10 253400
May 7, 2010   (CN) .......................... 2010 10 181893

(51) Int. Cl.
  *G01N 37/00*    (2006.01)
(52) U.S. Cl.
  USPC .......................................................... 702/84
(58) Field of Classification Search
  USPC .......................................................... 702/84
  See application file for complete search history.

(56) References Cited

U.S. PATENT DOCUMENTS

| | | | | |
|---|---|---|---|---|
| 2004/0088076 A1* | 5/2004 | Gardner, Jr. | ................... | 700/239 |
| 2006/0049946 A1* | 3/2006 | Sullivan et al. | ............ | 340/572.2 |
| 2011/0082595 A1* | 4/2011 | Mehus et al. | ................... | 700/283 |

FOREIGN PATENT DOCUMENTS

| | | |
|---|---|---|
| CN | 1444162 | 9/2003 |
| CN | 2662362 | 12/2004 |
| CN | 1626247 | 6/2005 |
| CN | 101702220 | 5/2010 |
| CN | 201616114 | 10/2010 |
| CN | 101986226 | 3/2011 |
| CN | 201780501 | 3/2011 |
| WO | 2011066771 A1 | 6/2011 |

\* cited by examiner

*Primary Examiner* — Tung S Lau
*Assistant Examiner* — Xiuquin Sun
(74) *Attorney, Agent, or Firm* — Berliner & Associates (57) ABSTRACT

The invention specifically discloses a type of real-time monitoring, feedback, identification and consistent labeling system for quality information of condom and glove products. The system includes a collection module, a processing output module connected to the collection module, an application module connected to the processing output module, and also a query module. This system allows users (consumers) to obtain real-time collected product production data or pre-entered, encryption code or pre-entered information data from each product and to compare these data with pre-entered product performance indexes.

6 Claims, 12 Drawing Sheets

REAL-TIME MONITORING, FEEDBACK, IDENTIFICATION AND LABELING SYSTEMS FOR CONDOM AND GLOVE PRODUCTS QUALITY INFORMATION AND METHODS THEREOF

CROSS-REFERENCE TO RELATED APPLICATIONS

This application is a continuation-in-part of application Ser. No. 12/830,647, filed on Jul. 6, 2010, now abandoned, which is incorporated by reference herein in its entirety.

TECHNICAL FIELDS

The present invention pertains to the technical fields of production and testing of covering products. In particular, the present invention pertains to real-time monitoring, feedback, identification and labeling systems for quality information for covering products such as condoms, medical gloves and disposable examination gloves.

BACKGROUND ART

Figure 1:
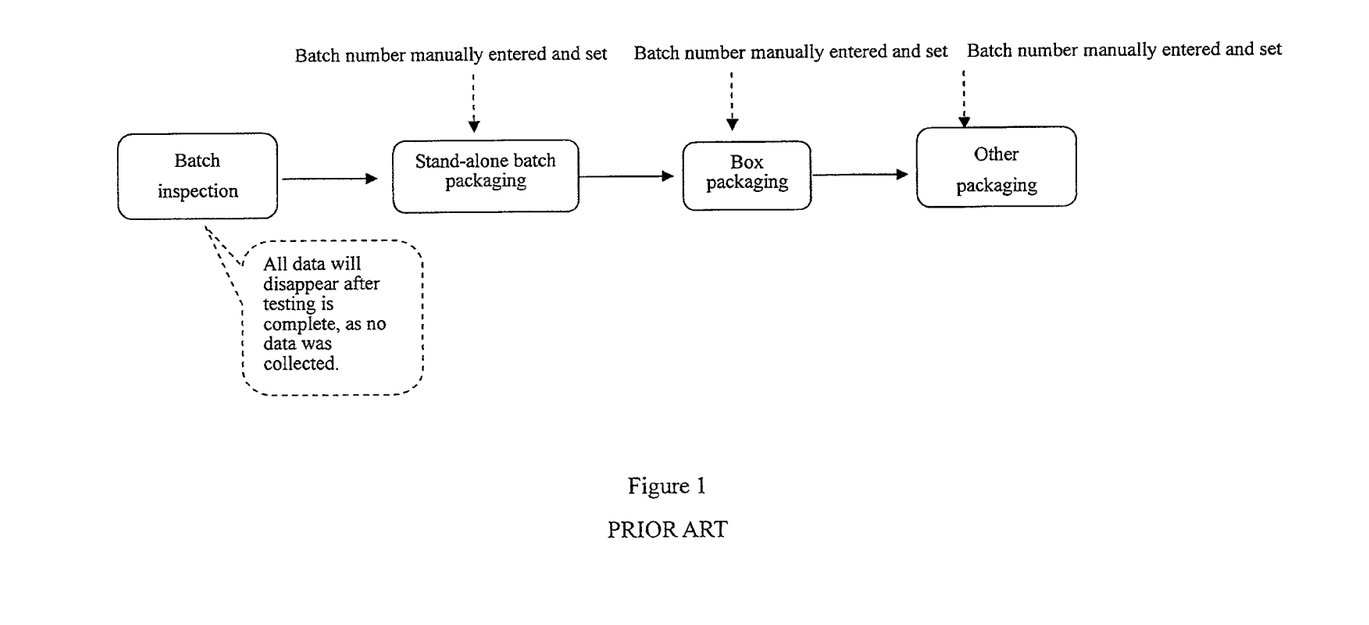
FIG. 1 is a schematic diagram of a prior art production and packaging process for condom and glove products.

FIG. 1 is a schematic diagram of a prior art production and packaging process for condom and glove products. Such prior art technology has a number of disadvantages.

A first disadvantage is that the quality of an entire batch of products is only represented by that of samples in declarations of product quality, which inevitably leads to a sampling risk.

A second disadvantage is that the environmental status, equipment operational status and production process status that may affect product quality are not monitored, leading to the absence of a direct, objective basis for declaring product quality.

A third disadvantage is that known technology only applies production batch numbers and production date information codes on packaging, the information codes applied to the layers of packaging are applied separately and independently, and the information codes on the packaging are not applied directly to the corresponding products themselves. Known technology is typically manually operated, often with a large degree of arbitrariness. This leaves larger room for errors and intentional modifications, which in turn provides unscrupulous manufacturers with opportunities to partially or completely remove the original packaging and repackage the products for resale for illicit profits, endangering users' rights and interests and also creating regulatory difficulties for regulatory agencies.

Therefore, declarations of condom and glove product quality in the prior art may be contrived or undisclosed since the products themselves do not necessarily have a corresponding relationship with their packaging, and they may be separate and mutually independent.

SUMMARY OF THE INVENTION

The objectives of the present invention are to overcome the defects in the prior art and provide a real-time monitoring, feedback, identification and consistent-labeling system for quality information of condom and glove products, which enables real-time and selective labeling, directly or indirectly, of environmental data, equipment operational data, production process data or inspection result data of the production process of each product to each product itself and its corresponding packaging (one or multiple layers) in a consistent manner, so that each product itself and its corresponding packaging (one or multiple layers) all feature corresponding individual quality data, allowing the manufacturer to bear full responsibility for the quality of each product, while preventing the sale of unqualified products on the market, preventing the possibility of partially or completely removing the original packaging for repackaging the products for resale, and also providing an effective basis for regulatory agencies and users to objectively assess product quality.

In order to achieve the foregoing technical objectives, the present invention provides the following technical solutions:

The invention is directed to a system comprising: a collection module, wherein environmental data, equipment operational status data, production process data, inspection result data, pre-entered encryption code or pre-entered information data are collected on a real-time or non-real-time basis; a data processing output module connected to the collection module, wherein the environmental data, equipment operational status data, production process data, inspection result data, pre-entered encryption code or pre-entered information data collected by the collection module are processed and outputted in real time; an application module connected to the data processing output module, where the processed and outputted environmental data, equipment operational status data, production process data, inspection result data, pre-entered encryption code or pre-entered information data are applied via linkage output device and a data transmission device to each product and a corresponding one or multiple layers of packaging, i.e. wherein the product and the corresponding one or multiple layers of packaging can be selectively labeled, directly or indirectly, with the environmental data, equipment operational status data, production process data, inspection result data or pre-entered encryption code or pre-entered information data; a query module, for allowing regulatory agencies or users to directly obtain the environmental data, equipment operational status data, production process data, inspection result data or pre-entered encryption code or pre-entered information data of the product from the product for corresponding layer(s) of packaging, and for allowing comparison of the data with product performance data index(es) of the product or batch of products pre-entered into the query module.

The system can be for real-time monitoring, feedback, identification and consistent-labeling of quality information of condom and glove products.

The data processing output module can comprise a data processing system and an output system. The collection module can comprise a physical collection apparatus or a chemical collection apparatus. The application module can comprise a data labeling apparatus that can selectively label all data, directly or indirectly, on the product and the corresponding one or multiple layers of packaging.

The environmental data can comprise all data influencing equipment or products at a production site, the equipment operational data comprise all equipment testing and monitoring data, the production process data comprise data from product and production process testing, and the inspection result data comprise data of results of all product inspection items.

A query platform of the query module can be accessed via Internet, telephone or text messages.

The condom and glove products can be condoms, medical gloves or disposable examination gloves.

The invention is also directed to a real-time monitoring, feedback, identification and consistent-labeling method for quality information of condom and glove products, the method comprising the steps of: (1) collecting in real time of environmental data, equipment operational status data, production process data, inspection result data or pre-entered encryption code or pre-entered information data through a collection module; (2) processing and outputting in real time of the environmental data, equipment operational status data, production process data, inspection result data or pre-entered encryption code or pre-entered information data collected by the collection module, through a data processing output module; (3) real-time and selective labeling, directly or indirectly, of the processed and outputted environmental data, equipment operational status data, production process data, inspection result data or pre-entered encryption code or pre-entered information data to each product and a corresponding one or multiple layers of packaging in a consistent manner, through an application module; (4) through a query module, allowing regulatory agencies or users to obtain quality information and status data during production of the condom and glove products via Internet, telephone or text messages, and to compare the data with product performance data indexes pre-entered into the query module.

Compared to the prior art, the present invention includes the following advantages:

(1) The present invention collects and processes, in real time, the environmental status of production of products such as condoms, medical gloves and disposable examination gloves, to provide a basis for determining whether the environment of the production process meets requirements for production equipment and product quality control.

(2) The present invention collects and processes, in real time, equipment operational status data, to provide a basis for determining whether equipment operations during the production process meet requirements for product quality control.

(3) The present invention collects and processes, in real time, production process data, to provide a basis for determining whether the production process meets requirements for product quality control.

(4) The present invention collects and processes, in real time, inspection results data, to provide a basis for determining whether the inspection results meet requirements for product quality standards.

(5) The present invention allows each product and its corresponding one or multiple layers of packaging to have directly corresponding and consistent individual quality data, resolving confusion and mismatches between the products and their corresponding one or multiple layers of packaging.

(6) The present invention allows each product to feature its individual quality data, avoiding the sampling risk where the quality of samples is representative of that of the entire batch of products, while also preventing intentional alteration of quality data.

(7) The present invention allows users and regulatory agencies to directly obtain real-time quality monitoring data for individual products by accessing the query platform without the need to remove packaging.

(8) The present invention allows users to understand and learn of product quality conditions.

(9) The present invention allows regulatory agencies to trace product quality.

(10) The present invention can enhance manufacturers' commitment, awareness and sense of responsibility with regard to product quality, and prevent unscrupulous manufacturers from partially or completely removing the original packaging for repackaging the products for illicit resale.

(11) The present invention can prevent unscrupulous manufacturers from mixing unqualified products with qualified products to circumvent sampling tests.

The following Chinese patent applications of the inventors are incorporated by reference herein in their entireties: Chinese Patent Application No. 200910253400.2, filed on Dec. 3, 2009; Chinese Patent Application No. 201010181893.6, filed on May 17, 2010.

BRIEF DESCRIPTION OF THE DRAWINGS

Exemplary embodiments are illustrated in figures of the drawings. It is intended that the embodiments and figures disclosed herein are to be considered illustrative rather than restrictive.

DETAILED DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Figure 2:
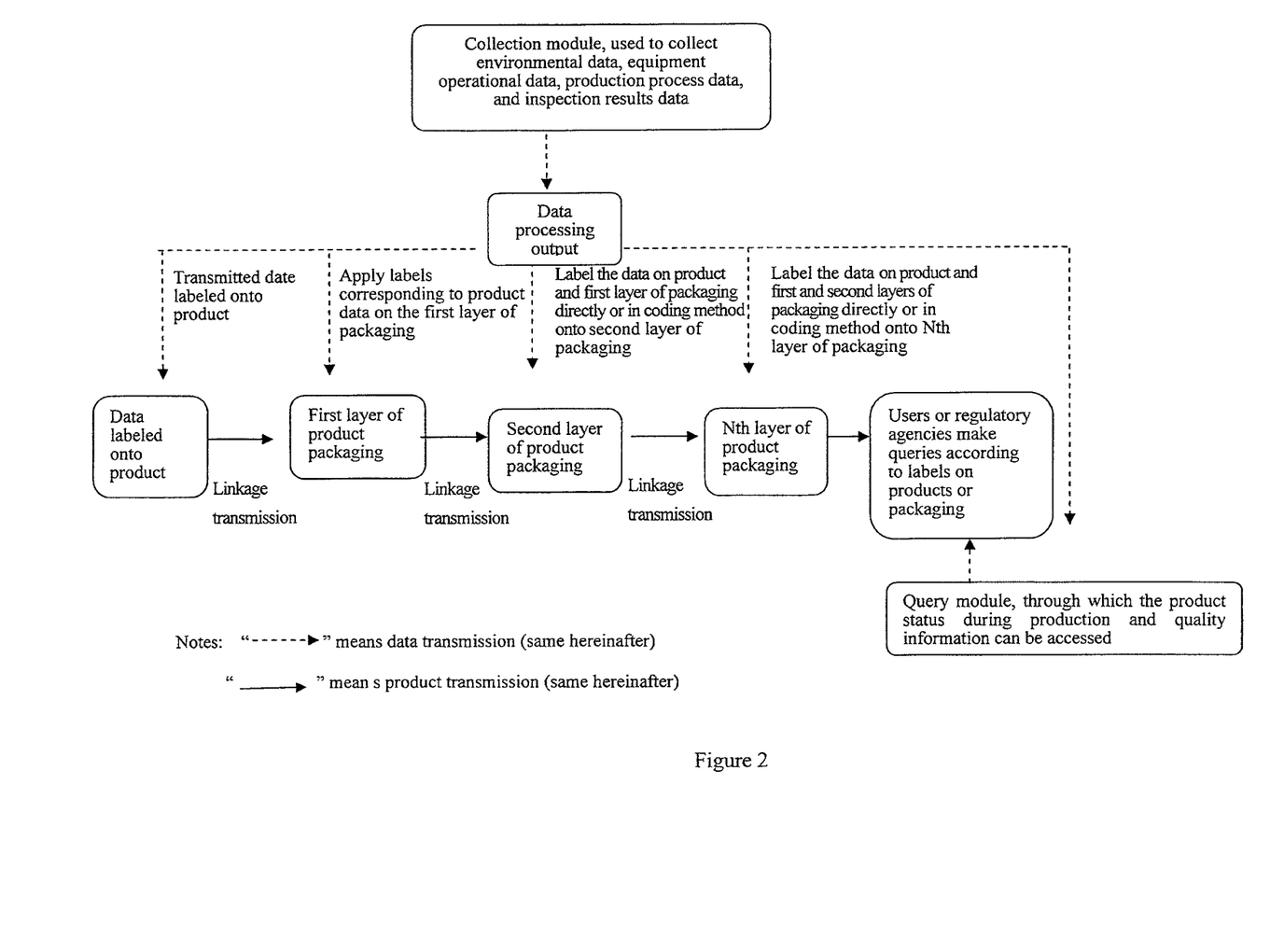
FIG. 2 is a schematic diagram of a system according to one embodiment of the present invention.

As shown in the embodiment in FIG. 2, the real-time monitoring, feedback, identification and consistent labeling system for quality information of condom and glove products of the present invention includes:

(i) a collection module, wherein environmental data, equipment operational status data, production process data, inspection result data, pre-entered encryption code or pre-entered information data are collected on a real-time or non-real-time basis;

(ii) a data processing output module connected to the collection module, wherein the environmental data, equipment operational status data, production process data, inspection result data, pre-entered encryption code or pre-entered information data collected by the collection module are processed and outputted in real time;

(iii) an application module connected to the data processing output module, where the processed and outputted environmental data, equipment operational status data, production process data, inspection result data, pre-entered encryption code or pre-entered information data are applied via linkage output device and a data transmission device to each product and a corresponding one or multiple layers of packaging, i.e. wherein the product and the corresponding one or multiple layers of packaging can be selectively labeled, directly or indirectly, with the environmental data, equipment operational status data, production process data, inspection result data or pre-entered encryption code or pre-entered information data;

(iv) a query module, for allowing regulatory agencies or users to directly obtain the environmental data, equipment operational status data, production process data, inspection result data or pre-entered encryption code or pre-entered information data of the product from the product for corresponding layer(s) of packaging, and for allowing comparison of the data with product performance data index(es) of the product or batch of products pre-entered into the query module. The data processing output module connected to said collection module, where the environmental data, equipment operational status data, production process data or inspection result data collected by the collection module are processed and outputted in real time.

The application module connected to said data processing output module, where the environmental data, equipment operational status data, production process data or inspection result data processed and outputted by the data processing output module are labeled consistently via linkage output device and data transmission device on each product itself and its corresponding one or multiple layers of packaging, i.e. each product itself and its corresponding one or multiple layers of packaging can be selectively labeled, directly or indirectly, with the environmental data, equipment operational status data, production process data or inspection result data in a consistent manner;

And also the query module, which allows consumers to directly obtain the environmental data, equipment operational status data, production process data and inspection result data of each stand-alone condom, and also to compare these data with product performance data indexes pre-entered into the query module.

The data processing output module may include data output labeling apparatus and data storage management apparatus.

The environmental data in the present invention includes all data affecting the equipment or products at the production site; the equipment operational data includes all equipment testing and monitoring data; the production process data includes data from product and production process testing; and the inspection result data includes data of results of all product inspection items.

The query platform of the query module of the present invention may be accessed via the Internet, telephone or text messages.

The following implementation examples correspond to specific embodiments of the present invention:

Implementation Example 1

Figure 3:
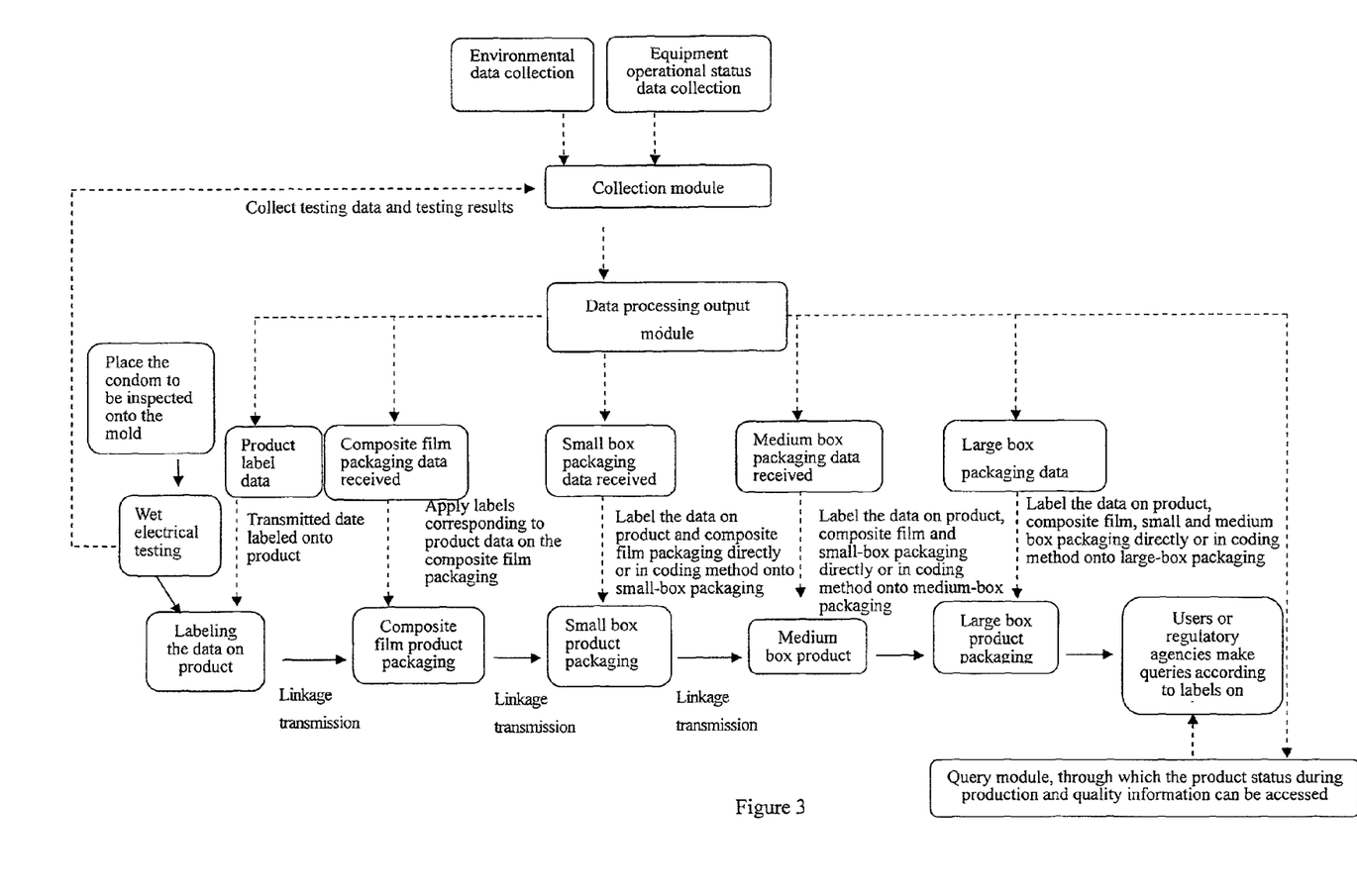
FIG. 3 is a diagram of implementation example 1 of the present invention.

As shown in FIG. 3, one embodiment of the present invention includes a collection module, processing module, data output module, device receiving and applying data to product and product packaging layers, linkage transmission device, data transmission device, and query module based on currently accepted condom wet electrical testing equipment and packaging equipment, with the specific process as follows:

(1) Placing the bare condom product for inspection on the mold;
(2) Wet electrical testing;
(3) Product drying;

(4) The data collection module collecting, in real time, the environmental data, equipment operational status data, production process data or inspection result data during product testing;

(5) The data output module outputting the data to the product data receiving and application device and the product packaging layers data receiving and application device that correspond to the condom inspection process, while transmitting data until the inspection standards are met and applying the dried bare condom;

(6) After the wet electrical testing, through the linkage transmission device and data transmission device of the application module, transferring the tested bare condom to a single packaging apparatus for the first layer of packaging (for example, composite film packaging), receiving the data of the first layer of product packaging (composite film packaging), and correspondingly presenting data for product labels on the first layer of product packaging (composite film);

(7) Through the linkage transmission device, sequentially transmitting the first layer of product packaging to the second layer of product packaging (small box packaging); receiving the data for the second layer of product packaging and correspondingly labeling the data labeled on the product and first layer of packaging directly or indirectly on the second layer of packaging; then correspondingly labeling the same labels on the third layer of packaging (medium box packaging) and the fourth layer of packaging (large box packaging).

Implementation Example 2

Figure 4:
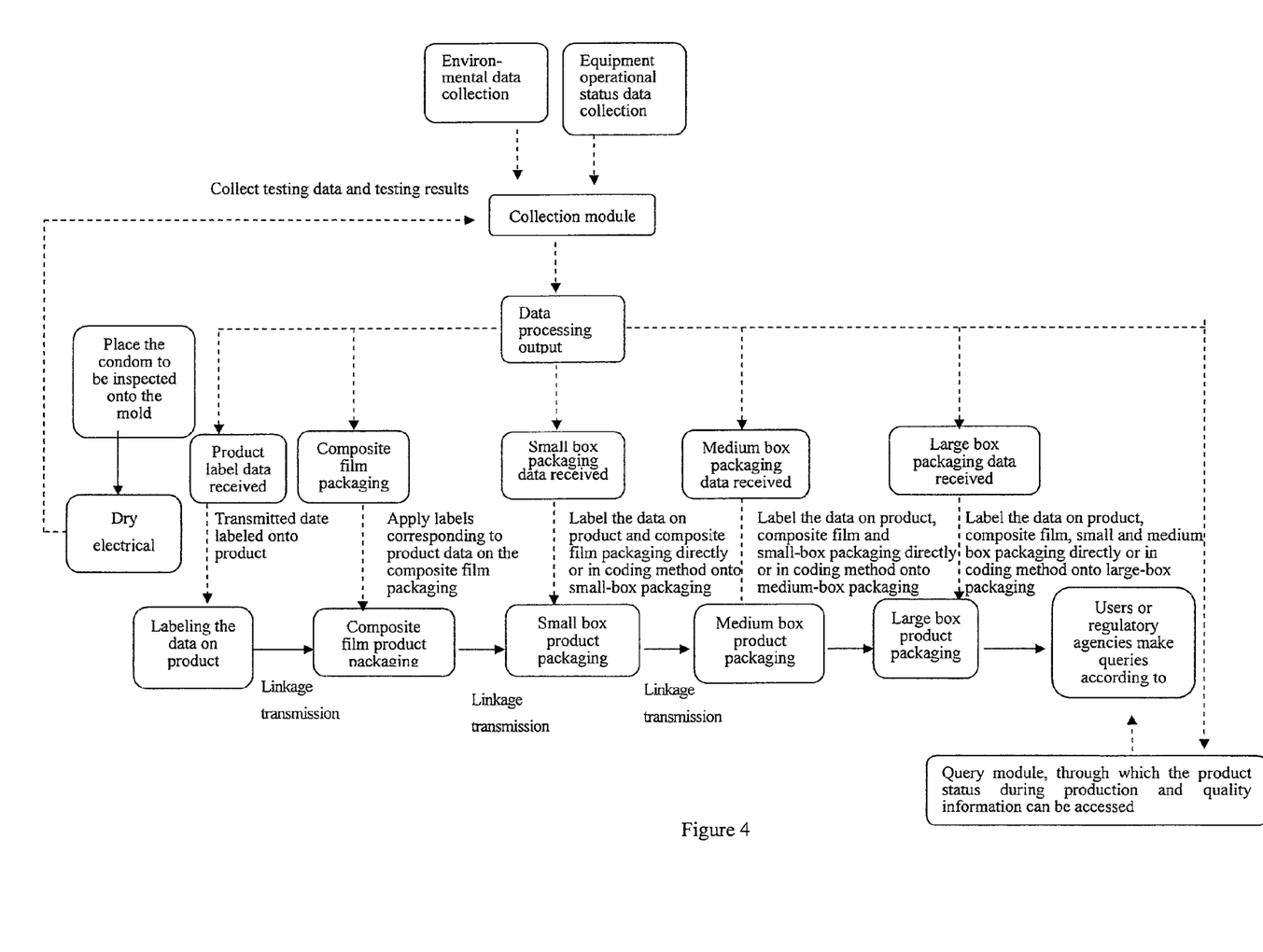
FIG. 4 is a diagram of implementation example 2 of the present invention.

FIG. 4 shows another embodiment of the invention for testing, packaging and labeling based on dry electrical testing method for condoms. This example adds a data output module, linkage transmission device and data transmission device based on currently accepted condom dry electrical testing equipment and packaging equipment, with the specific process essentially the same as in implementation example 1, but with the difference that product drying in step (3) of implementation example 1 is omitted because the dry electrical testing method is used.

Implementation Example 3

Figure 5:
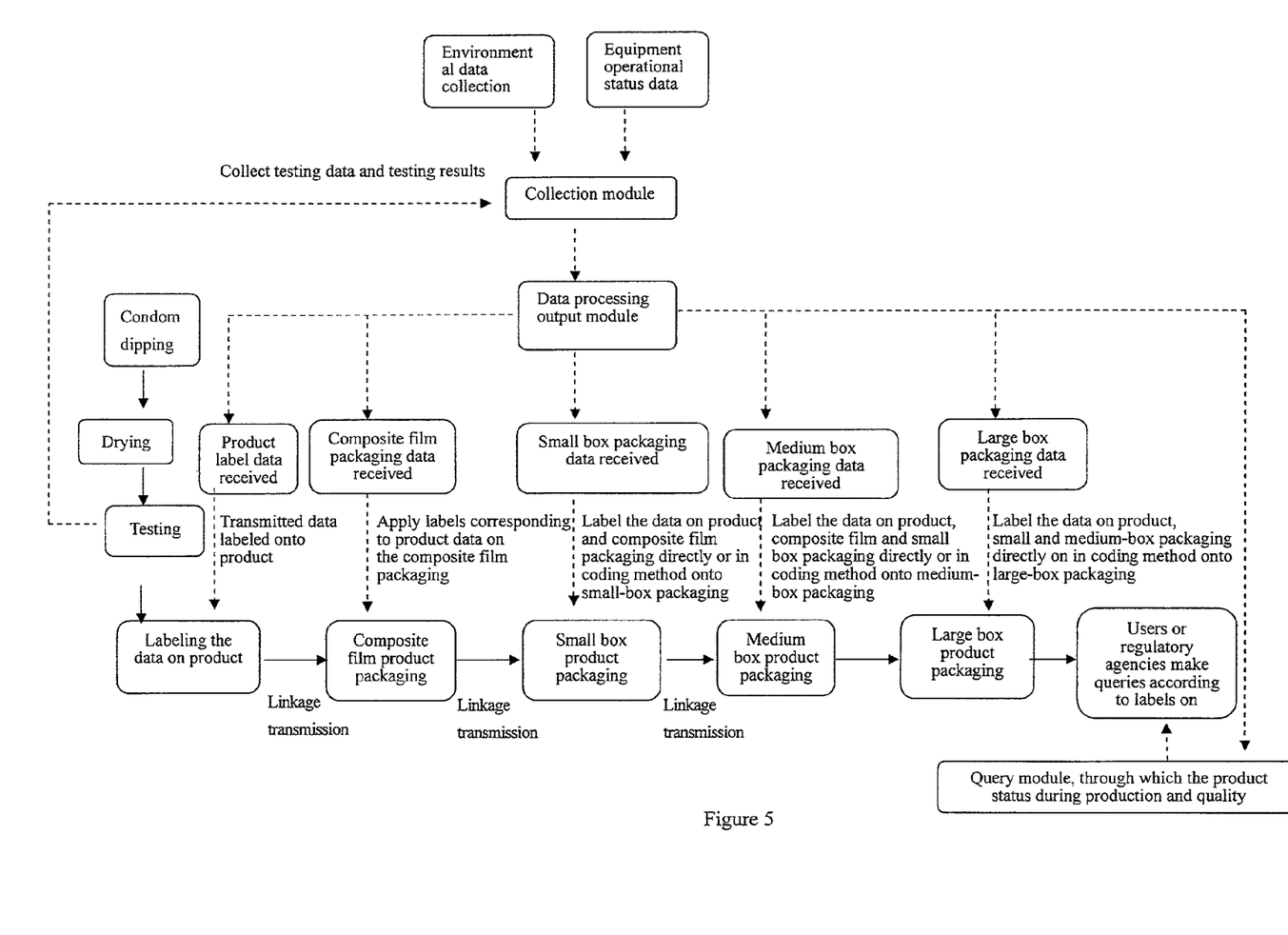
FIG. 5 is a diagram of implementation example 3 of the present invention.

FIG. 5 shows another embodiment including packaging equipment, and adds a collection module, data processing output module, linkage transmission device, data transmission device and query module, on the basis that the condom dipping production and inspection equipments are integrated linkage devices, with the specific process as follows:

(1) Dipping for molding;
(2) Drying;
(3) Testing;
(4) Product drying (this step is omitted if dry electrical test is used);
(5) Using the data collection module to collect in real time the environmental data, equipment operational status data, production process data or inspection result data during product testing;
(6) The data output module outputting the data to the product data receiving module and the product packaging layers data receiving and applying modules that correspond to the condom inspection process, while transmitting data until the inspection standards are met and applying the dried bare condom;
(7) After the electrical test, through the linkage transmission device and data transmission device of the application module, transferring the bare condom tested to a single packaging apparatus for the first layer of product packaging (composite film packaging), receiving the data of the first layer of product packaging and correspondingly presenting data for product labels on the first layer of product packaging;

(8) Through linkage transmission device, sequentially transmitting the first layer of packaging to the second layer of product packaging (small box packaging); receiving the data for the second layer of product packaging and, directly or indirectly, correspondingly labeling data labeled on the product and first layer of packaging on the second layer of packaging; then correspondingly labeling the same labels on the third layer of packaging (medium box packaging) and the fourth layer of packaging (large box packaging).

Implementation Example 4

Figure 6:
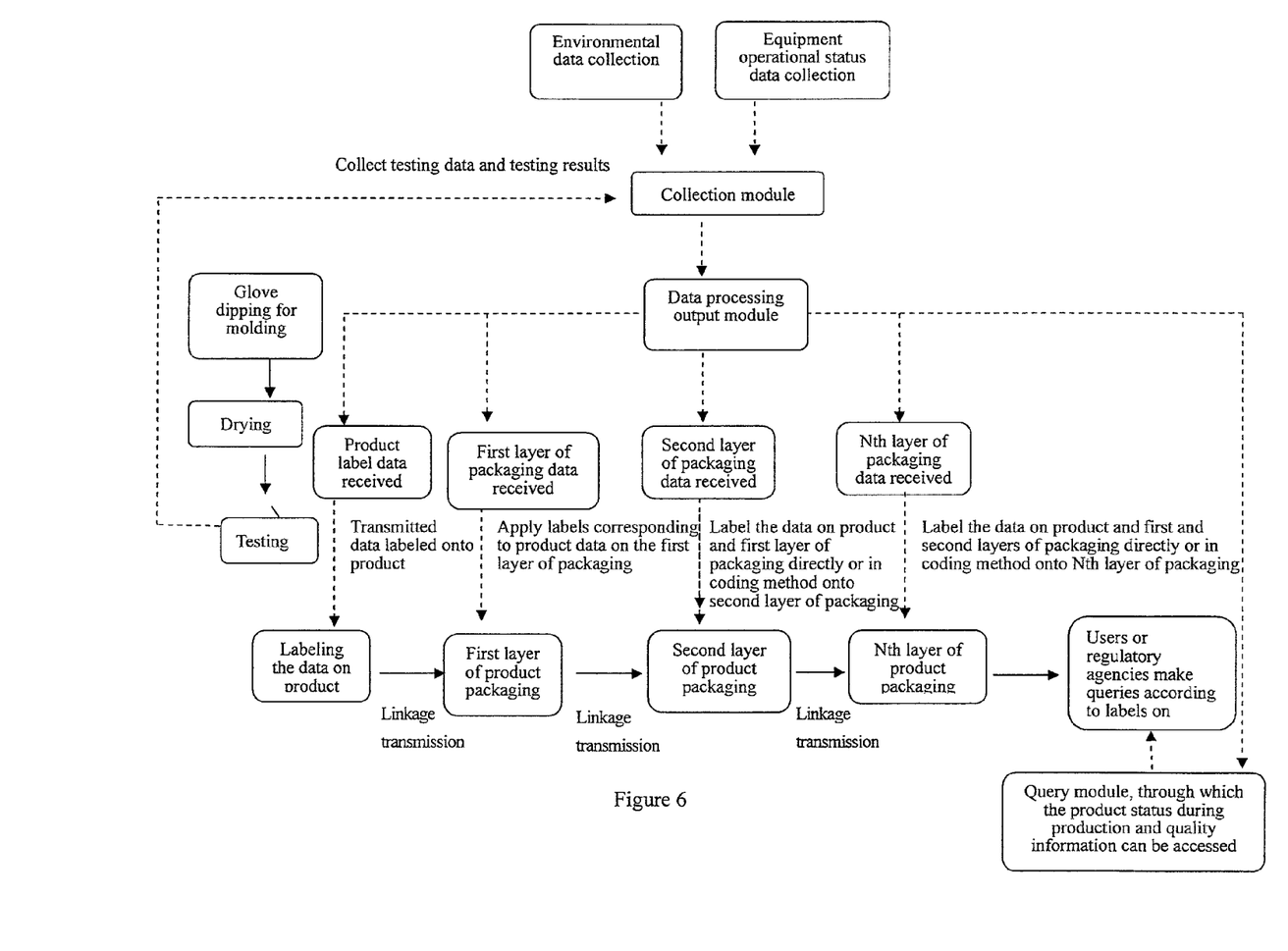
FIG. 6 is a diagram of implementation example 4 of the present invention.

FIG. 6 shows another embodiment including packaging equipment, and adds a collection module, data processing output module, linkage transmission device, data transmission device and query module on the basis of integrated devices for the generally accepted production inspection of medical gloves and disposable examination gloves, with the specific process as follows:

(1) Dipping for molding;
(2) Drying;
(3) Testing;
(4) Product drying;
(5) Using the data collection module to collect in real time the environmental data, equipment operational status data, production process data or inspection result data during product testing;
(6) The data output module outputting the data to the product data receiving module and product packaging layers data receiving and applying modules that correspond to the inspection process of medical gloves and disposable examination gloves, while transmitting data until the inspection standards are met and applying the dried bare medical gloves and disposable examination gloves;
(7) After the electrical test, through the linkage transmission device and data transmission device of the application module, transferring the medical gloves and disposable examination gloves tested to a single packaging apparatus for the first layer of product packaging, receiving the data for the first layer of product packaging and correspondingly presenting data for product labels on the first layer of product packaging;
(8) Through linkage transmission device, sequentially transmitting the first layer of product packaging to the second layer of product packaging; receiving the data for the second layer of product packaging and, directly or indirectly, correspondingly labeling data labeled on the product and first layer of packaging on the second layer of packaging; then correspondingly labeling the same labels on the third layer of product packaging.

Implementation Example 5

Figure 7:
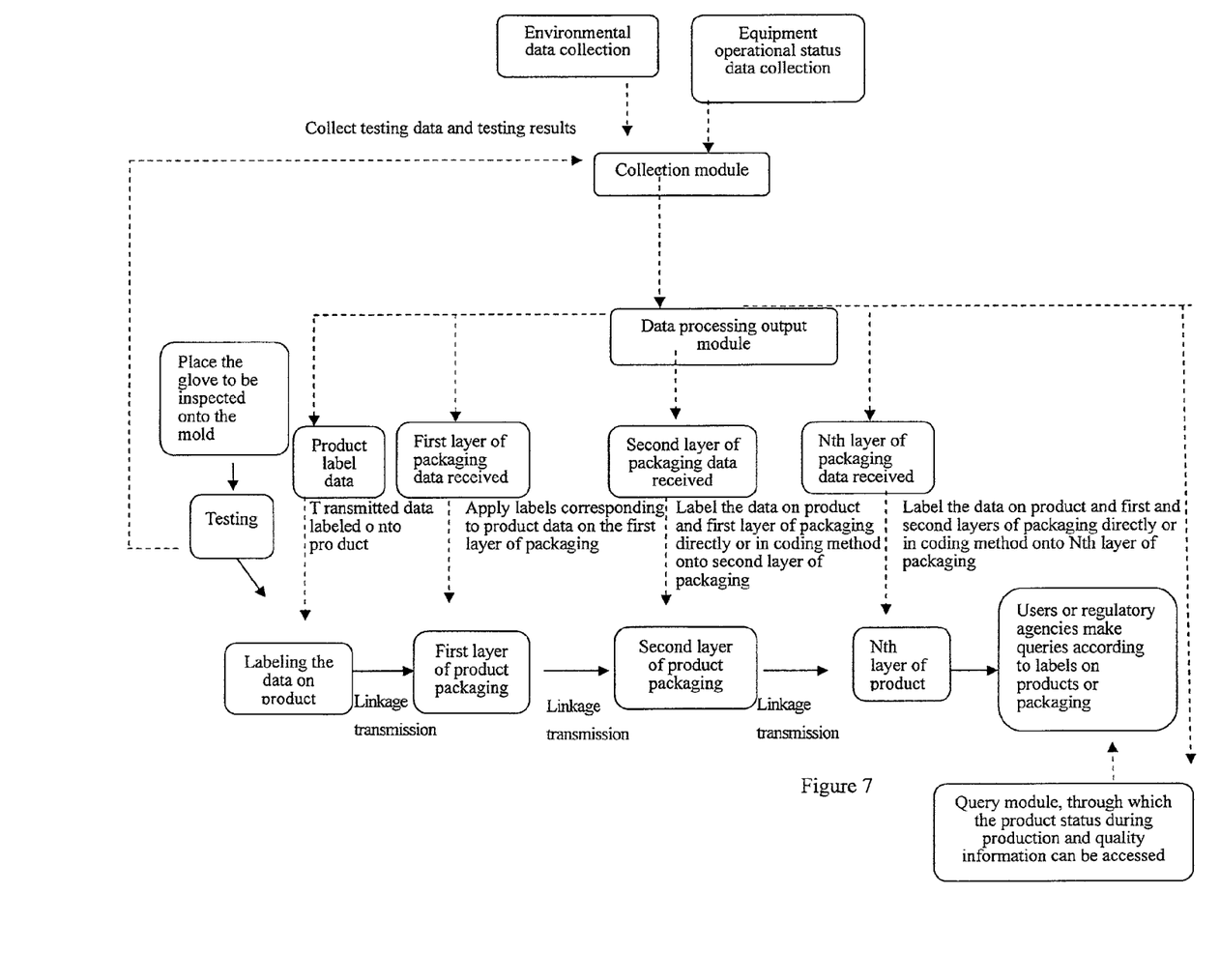
FIG. 7 is a diagram of implementation example 5 of the present invention.

FIG. 7 shows an embodiment including collection module, data processing output module, linkage transmission device, data transmission device and query module based on currently accepted inspection equipment and packaging equipment for medical gloves and disposable examination gloves, with the specific process as follows:

(1) Placing the product to be inspected onto the mold;
(2) Testing;
(3) Product drying;
(4) Using the data collection module to collect in real time the environmental data, equipment operational status data, production process data or inspection result data during product testing;
(5) The data output module outputting the data to the product data receiving module and product packaging layers data receiving and applying modules that correspond to the inspection process of medical gloves and disposable examination gloves, while transmitting data until the inspection standards are met and applying the dried medical gloves and bare disposable examination gloves;
(6) After the electrical test, through the linkage transmission device and data transmission device of the application module, transferring the medical gloves and bare disposable examination gloves tested to a single packaging apparatus for the first layer of product packaging, receiving the data of the first layer of product packaging and correspondingly labeling data for product labels on the first layer of product packaging;
(7) Through linkage transmission device, sequentially transmitting the first layer of product packaging to the second layer of product packaging; receiving the data for the second layer of product packaging and, directly or indirectly, correspondingly labeling data labeled on the product and first layer of packaging on the second layer of packaging; then correspondingly labeling the same labels continue on the third layer of product packaging.

Implementation Example 6

Figure 8:
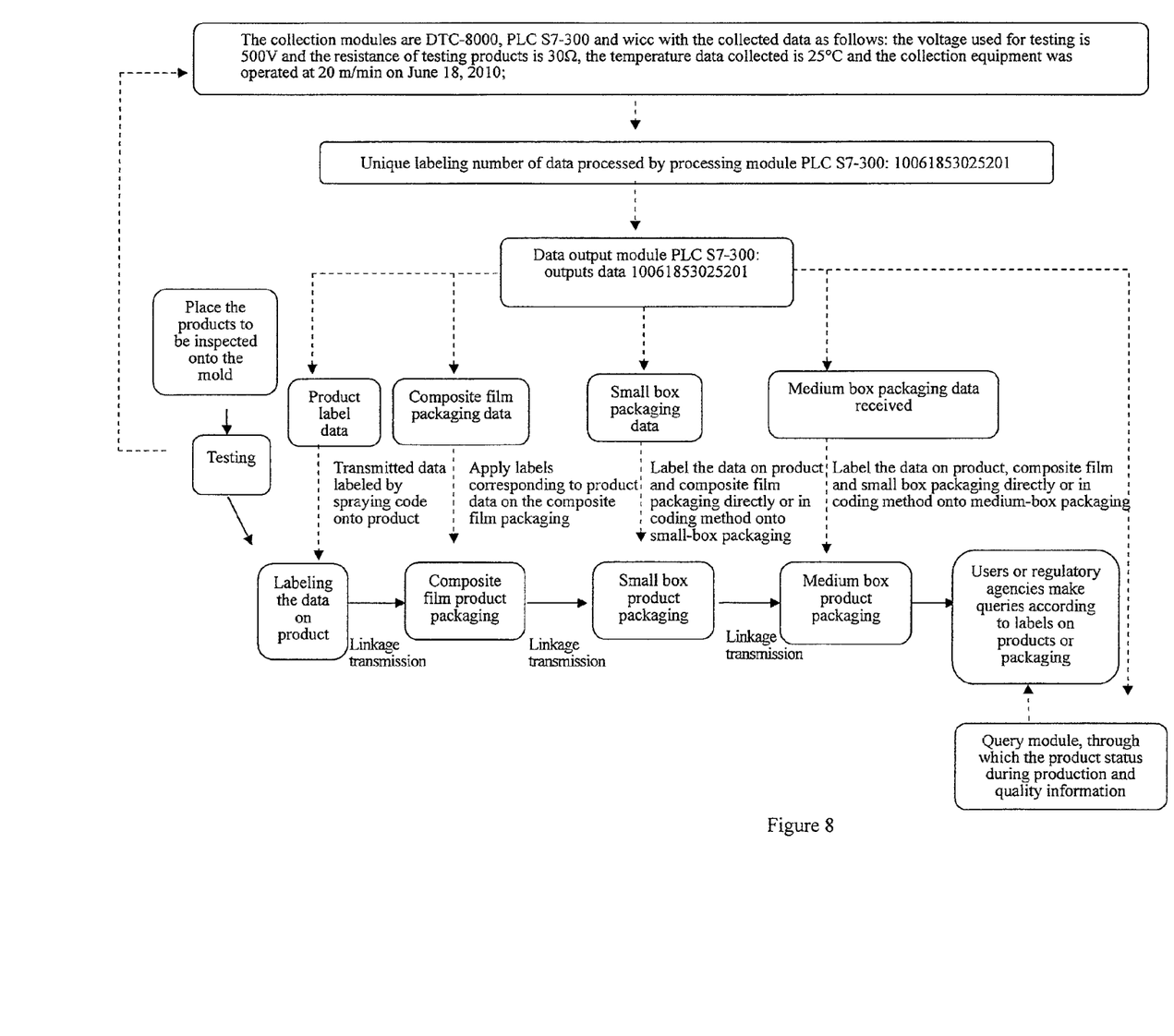
FIG. 8 is a diagram of implementation example 6 of the present invention.
Figure 9:
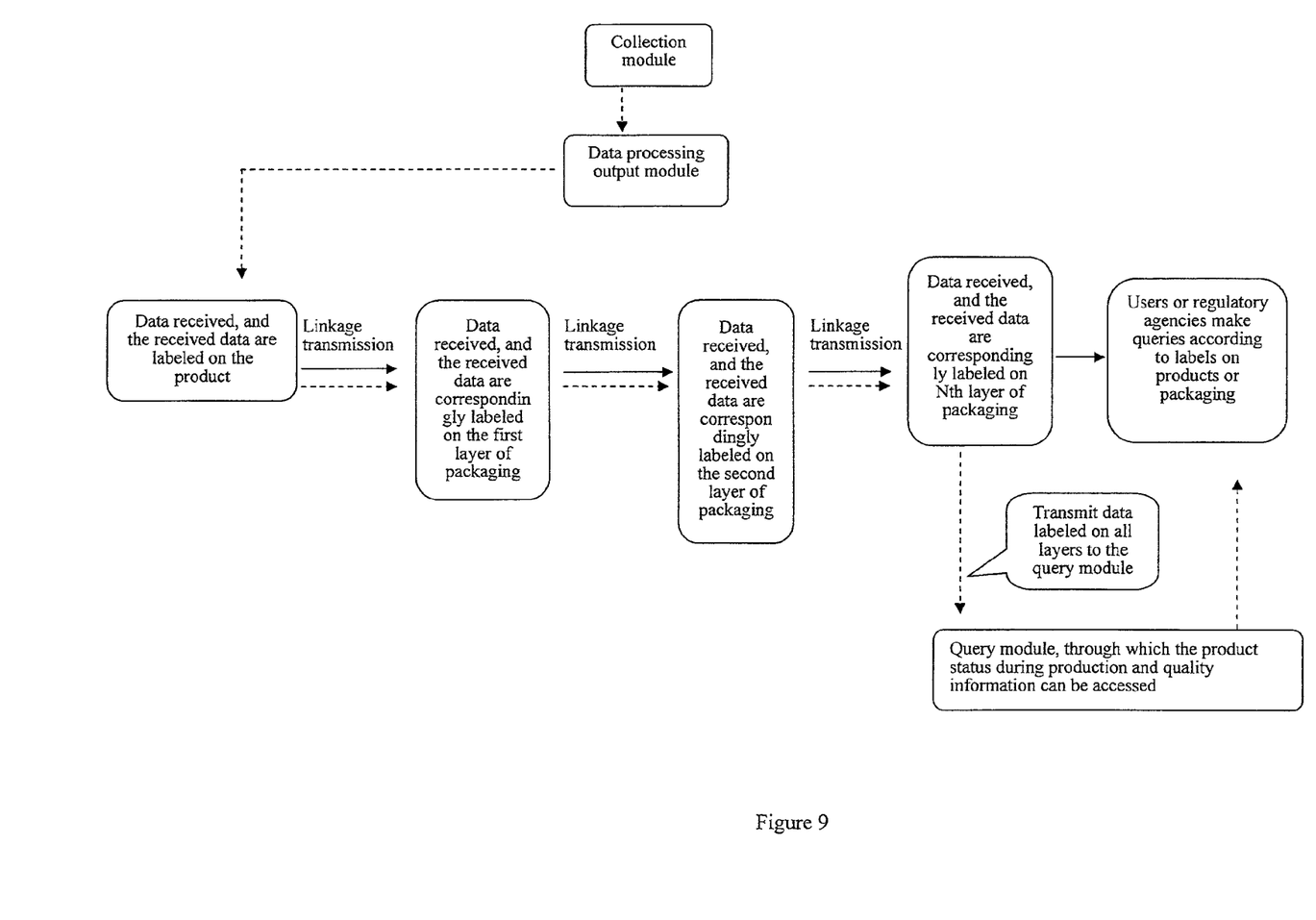
FIG. 9 is a theoretical diagram of operation procedures for implementation example 6 of the present invention.

FIGS. 8 and 9 show an embodiment including a collection module, data processing output module, linkage transmission device, data transmission device and query module based on currently accepted condom wet electrical testing equipment, with the specific process as follows:

(1) Placing the product to be inspected onto the mold;
(2) Collecting the product production data through the collection module DTC-8000, PLC S7-300 and wicc, the voltage used for collection testing being 500V and the resistance of testing products being 30Ω;
(3) Collecting the environmental data through the collection module DTC-8000, PLC S7-300 and wicc, the temperature data collected being 25° C., and the equipment operational data collection module collection apparatus operating at 20 m/min on Jun. 18, 2010;
(4) Creating a unique labeling code of collected data for processing module PLC S7-300: 10061853025201 based on the operation date and parameters;
(5) Product drying;
(6) The data output module PLC S7-300 labeling the output data onto the product, single packaging and consumption packaging in the form of spraying, while transmitting data to the query module which is controlled by wincc;

With the above steps, the entire process of testing products on wet electrical testing equipment, controlling and information output, as well as product sorting test, is completed.

Implementation Example 7

Figure 10:
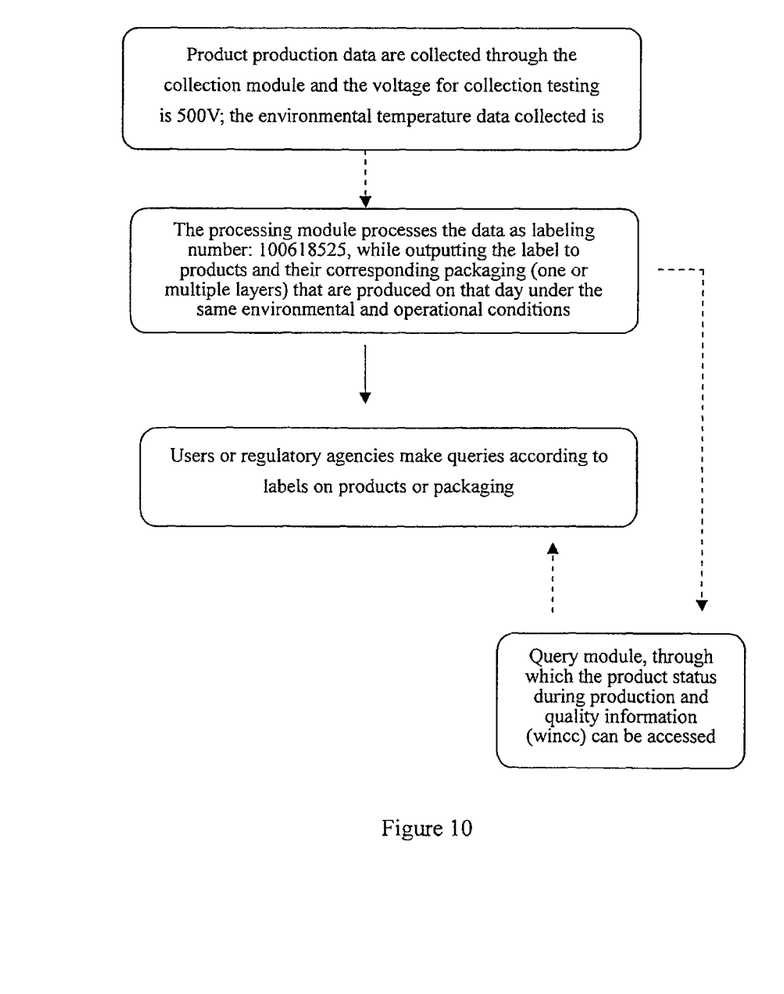
FIG. 10 is a diagram of implementation example 7 of the present invention.

FIG. 10 shows an embodiment including a collection module, processing module, data processing output module, linkage transmission device and query module based on currently accepted testing equipment, with the specific process as follows:

(1) Using the collection system to collect in real time the environmental data, equipment operational status data, production process data or inspection result data during product testing;

(2) Through data processing output module, outputting the data onto the product;

(3) Through linkage transmission device and data transmission device, data labeled on the product onto the first layer of packaging;

(4) Through linkage transmission device and data transmission device, directly or indirectly outputting data labeled on the first layer of packaging onto the second layer of packaging;

(5) Through linkage transmission device and data transmission device, directly or indirectly outputting data labeled on the second layer of packaging onto the third layer of packaging;

(6) Through linkage transmission device and data transmission device, directly or indirectly outputting data labeled on the third layer of packaging onto the Nth layer of packaging;

(7) Through a query device, users (e.g. consumers and regulatory agencies) making queries via the Internet, telephone, or text messages.

Implementation Example 8

Figure 11:
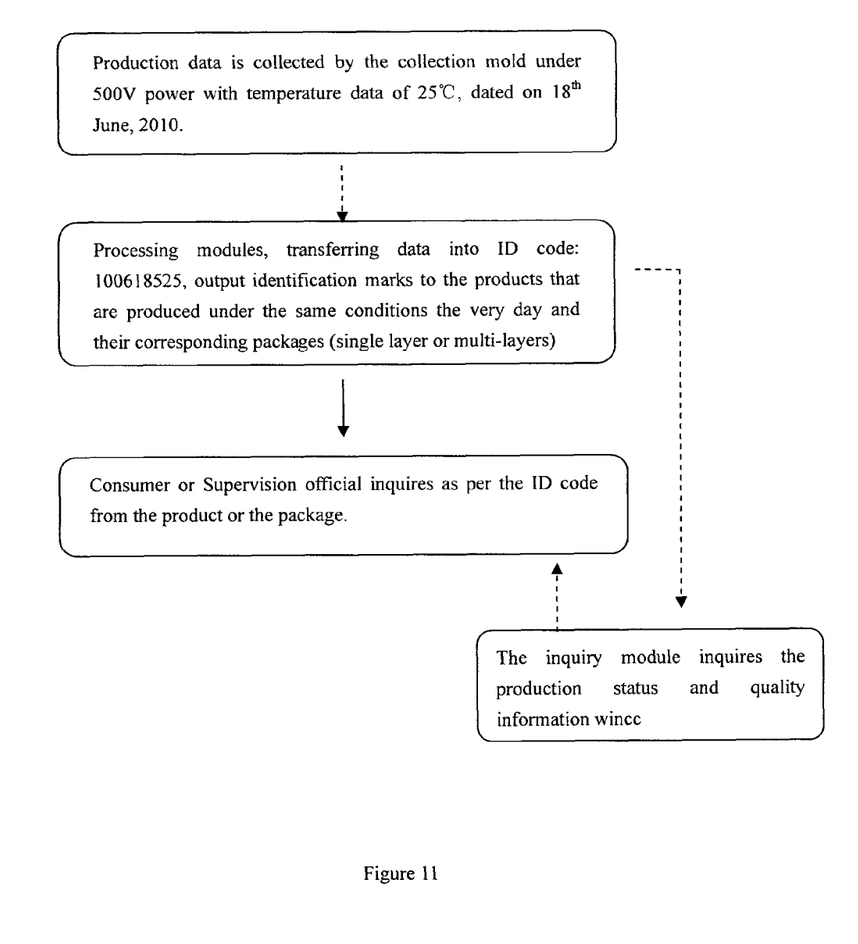
FIG. 11 is a diagram of implementation example 8 of the present invention.

FIG. 11 shows an embodiment including a collection module, data processing output module, linkage transmission device, data transmission device and query module based on currently accepted condom wet electrical testing equipment, and the collected data are identical to a certain extent, with the specific process as follows:

(1) Placing the product to be inspected onto the mold;

(2) Collecting the product production data through the collection module and the voltage for collection testing being 500V;

(3) Collecting the environmental data through the collection module, the temperature data collected being 25° C. and the equipment operational data collection module collection apparatus operating on Jun. 18, 2010;

(4) Processing the collected data by the processing module using the unique labeling code: 100618525;

(5) Product drying;

(6) The data output module labeling the output data "100618525" onto the product, single packaging and consumption packaging that are produced on that day under the same operational conditions and environment, while transmitting data to the query module;

With the above steps, the entire process of testing products on wet electrical equipment, controlling and information output, as well as product sorting test, is completed.

Implementation Example 9

Figure 12:
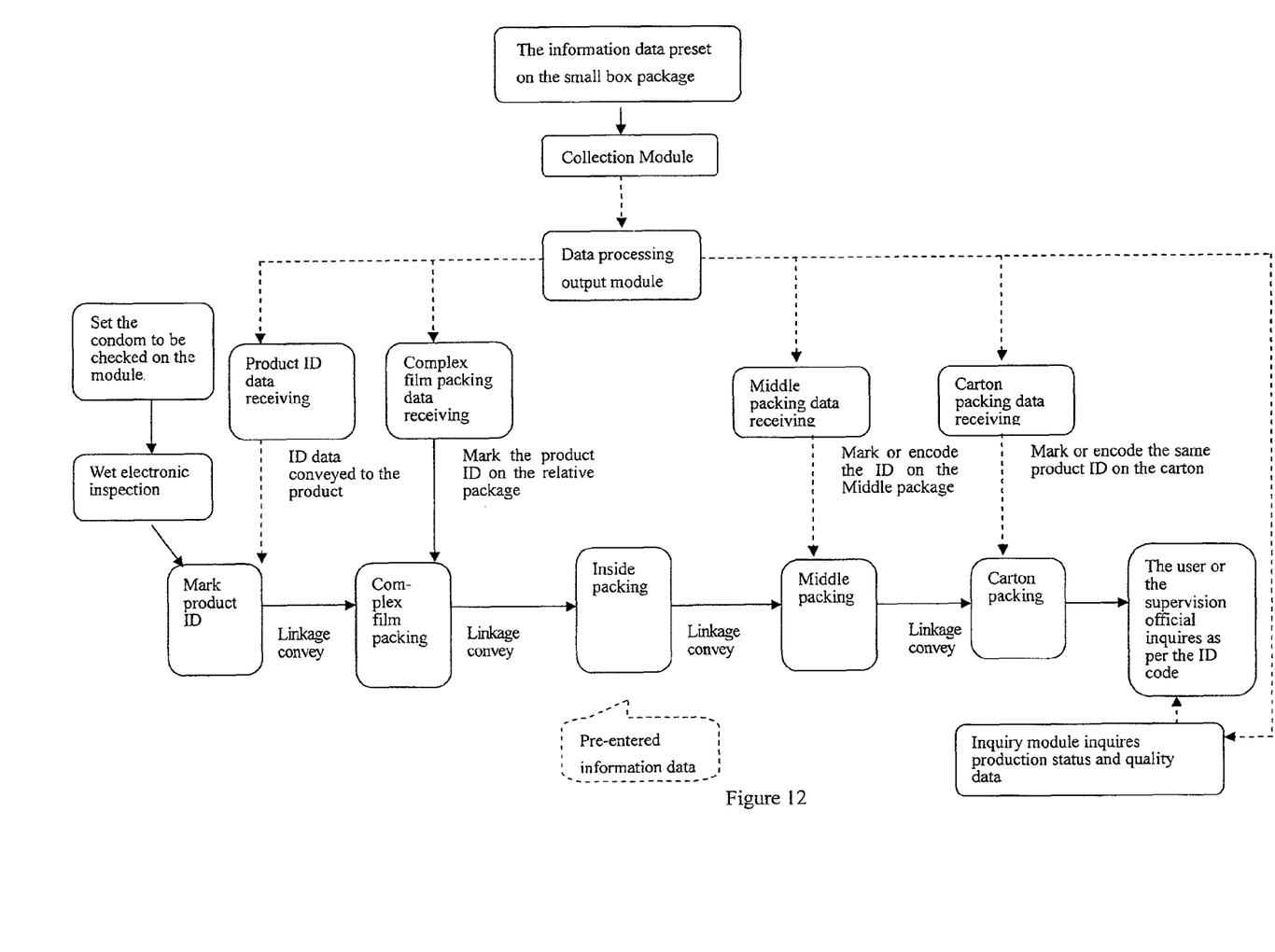
FIG. 12 is a diagram of implementation example 9 of the present invention.

FIG. 12 shows an embodiment that includes a collection module, data processing output module, linkage transmission device, data transmission device, query module, and a device for receiving and applying data on a product and its corresponding packaging layers based on condom wet electrical testing equipment. The data collected is identical to a certain extent. The specific process is as follows:

(1) Placing the product to be inspected on the module;

(2) Performing the inspection;

(3) Drying the product;

(4) The data collection module, in real time, collecting information data that is pre-entered on small box packaging;

(5) The data output module outputting the data to the product data receiving and applying device corresponding to the condom inspection process, and product layers packaging data receiving and applying device, simultaneously, to the conforming, dried and bare condom;

(6) Transferring the bare condom that has passed the electrical test through the linkage transmission device and the data transmission device of the application module to a single packaging apparatus for the first layer of packaging (e.g. the composite film packaging), with the data of the first layer packaging received and that of product label presented on the first layer packaging;

(7) Transmitting the first layer packaging through the linkage transmission device sequentially to the second layer packaging (small box packaging), where the second layer packaging data which is pre-entered corresponds identically to the data on the product; and then the same label continuing to be relabeled correspondingly on the third layer packaging (medium box packaging) and the fourth layer packaging (large box packaging) as the case may be.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

The invention claimed is:

1. A system for real-time monitoring, feedback, identification and consistent-labeling of quality information of condom and glove products comprising:

a collection module, wherein environmental data, equipment operational status data, production process data, inspection result data, pre-entered encryption code or pre-entered information data are collected on a real-time or non-real-time basis;

a data processing output module connected to the collection module, wherein the environmental data, equipment operational status data, production process data, inspection result data, pre-entered encryption code or pre-entered information data collected by the collection module are processed and outputted in real time;

an application module connected to the data processing output module, where the processed and outputted environmental data, equipment operational status data, production process data, inspection result data, pre-entered encryption code or pre-entered information data are applied via linkage output device and a data transmission device to each product and a corresponding one or multiple layers of packaging, wherein the product and the corresponding one or multiple layers of packaging can be selectively labeled, directly or indirectly, with the environmental data, equipment operational status data, production process data, inspection result data or pre-entered encryption code or pre-entered information data; and a query module, for allowing regulatory agencies or users to directly obtain the environmental data, equipment operational status data, production process data, inspection result data or pre-entered encryption code or pre-entered information data of the product from the product or corresponding layer(s) of packaging, and for allowing comparison of the data with product performance data index(es) of the product or batch of products pre-entered into the query module, wherein the condom and glove products are condoms, medical gloves or disposable examination gloves.

2. A system according to claim 1, wherein the data processing output module comprises a data processing system and an output system.

3. A system according to claim 2, wherein the collection module comprises a physical collection apparatus or a chemical collection apparatus.

4. A system according to claim 3, wherein the application module comprises a data labeling apparatus that can selectively label all data, directly or indirectly, on the product and the corresponding one or multiple layers of packaging.

5. A system according to claim 1, wherein the environmental data comprise all data influencing equipment or products at a production site, the equipment operational data comprise all equipment testing and monitoring data, the production process data comprise data from product and production process testing, and the inspection result data comprise data of results of all product inspection items.

6. A system according to claim 1, wherein a query platform of the query module is accessed via a global computer network, telephone or text messages.

* * * * *